United States Patent [19]

LeBlanc

[11] Patent Number: 5,122,299

[45] Date of Patent: * Jun. 16, 1992

[54] AUTOTHERMAL STEAM REFORMING PROCESS

[75] Inventor: Joseph R. LeBlanc, Houston, Tex.

[73] Assignee: The M. W. Kellogg Company, Houston, Tex.

[*] Notice: The portion of the term of this patent subsequent to Apr. 30, 2008 has been disclaimed.

[21] Appl. No.: 658,604

[22] Filed: Mar. 14, 1991

Related U.S. Application Data

[63] Continuation-in-part of Ser. No. 448,422, Dec. 11, 1989, Pat. No. 5,011,625.

[51] Int. Cl.$^5$ .............................. C01J 1/02; C01B 3/38
[52] U.S. Cl. ..................................... 252/376; 252/373
[58] Field of Search ................................ 252/373, 376

[56] References Cited

U.S. PATENT DOCUMENTS 5,011,625  4/1991  Le Blanc .............................. 252/376

Primary Examiner—Howard T. Mars
Attorney, Agent, or Firm—John P. Ward

[57] ABSTRACT

Synthesis gases are produced by reaction of steam, oxidant, and a major portion of fresh hydrocarbon feed in an exothermic catalytic reforming zone to a first reformed gas having very low methane content. The balance of the fresh feed is reacted with steam in an endothermic catalytic reforming zone to a second reformed gas having a low methane content. The first and second reformed gases are combined and passed in indirect heat exchange with reactants in the endothermic reforming zone to provide all of the heat required therein and are then recovered as product synthesis gases.

7 Claims, 1 Drawing Sheet

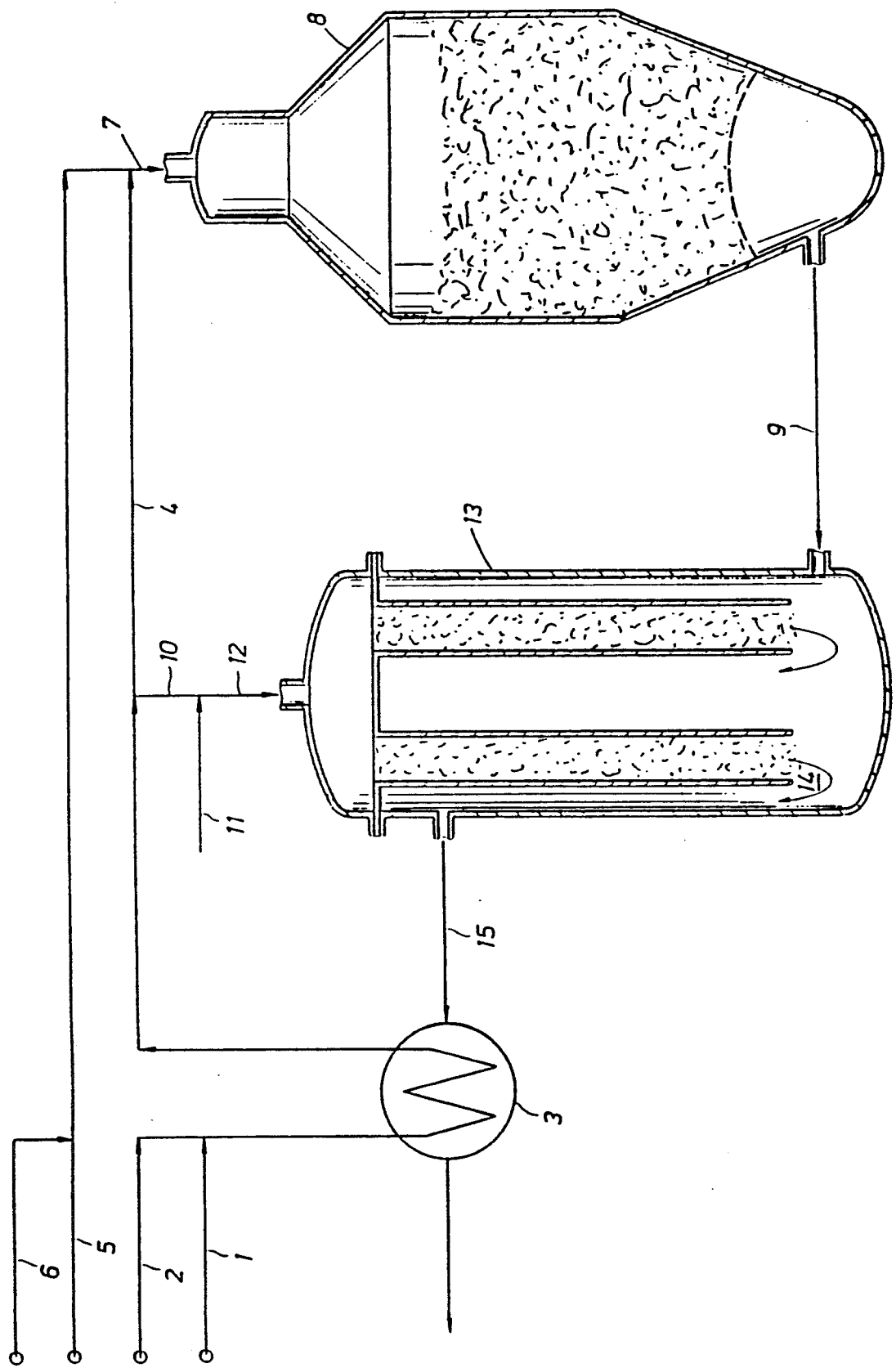

AUTOTHERMAL STEAM REFORMING PROCESS

This application is a continuation in part application of U.S. patent application Ser. No. 448,422, filed Dec. 11, 1989 now U.S. Pat. No. 5,011,625.

FIELD OF THE INVENTION

This invention relates to production of ammonia and methanol from hydrocarbons such as, for example, natural gas and specifically relates to the production of ammonia and methanol synthesis gases containing hydrogen and nitrogen and hydrogen and carbon oxides respectively with reduced fuel gas requirements made possible by deletion of the fired tube primary reforming furnace customarily employed in commercial practice.

BACKGROUND OF THE INVENTION

The customary steps of primary and secondary reforming to produce ammonia synthesis gases and primary reforming to produce methanol synthesis gases are well known both technically and economically. From the latter view point, these steps are recognized as controlling factors in determining the "feed and fuel" requirements for each unit of ammonia or methanol produced because both steps require heat from combustion of hydrocarbon for the endothermic reaction of steam with hydrocarbon feed.

Commercial primary reformers are fuel fired furnaces having large tubes filled with nickel-containing catalyst wherein approximately 60 to 80 volume percent of the fresh hydrocarbon feed is converted with added steam to hydrogen and carbon oxides. This primary reformed gas additionally contains unreacted steam and the balance of the hydrocarbon feed as methane. From the process viewpoint, the primary reformer is an endothermic catalytic steam reforming zone.

For ammonia production the primary reformed gas then is introduced to the secondary reformer which is typically a refractory-lined vessel filled with nickel-containing catalyst and has no provision for supply of external heat. In secondary reforming, heat for endothermic reaction of the remaining methane with steam is supplied by combustion of part of the primary reformed gas with externally supplied oxidant. From the process viewpoint, the secondary reformer is an exothermic catalytic steam reforming zone and is sometimes referred to as an autothermal reformer.

The hot synthesis gas produced in secondary reformer is comprised of hydrogen, nitrogen, carbon monoxide (which is subsequently converted to additional hydrogen), carbon dioxide, unreacted steam, residual methane, and small quantities of inert gases. Customarily, this hot synthesis gas is heat exchanged with boiler feedwater to raise turbine steam required in compression services for secondary reformer oxidant, synthesis gas, and refrigerant employed in ammonia or methanol product recovery.

Despite this use, practitioners have long desired to employ heat of the secondary reformer outlet gas in the alternative service of primary reforming through use of a reactor/heat exchanger and thereby minimize size of the conventional fired tube reforming furnace. Ideally, the furnace would be deleted if sufficient primary reforming duty could be moved to the secondary reformer in order to balance heat requirement of the endothermic reforming step with heat availability from the exothermic reforming step. This heat balance requires substantially more combustion in the secondary reformer, hence use of excess oxidant. In the production of ammonia synthesis gas where air is employed as an oxidant the need for an excess of this oxidant necessitates downstream removal of excess nitrogen to achieve the desire hydrogen/nitrogen ratio in the final ammonia synthesis gas.

Reactor/exchangers proposed for this service have been high temperature heat exchangers having single-pass tubes fixed at each end to tube sheets. While considerably less costly than fired tube furnaces, their high temperature design leads to high fabrication cost. Perhaps more importantly, particularly in the production of ammonia synthesis gas, is the large quantity of excess nitrogen in the final synthesis gas which results from the heat balance problem indicated above which leads to the necessity for an uneconomically large nitrogen rejection system preceding or within the synthesis section of an ammonia plant.

More recently, open-end bayonet tube reactor/exchangers of the general type shown in U.S. Pat. No. 2,579,843 have been considered for primary reforming service because of their more simple design in comparison with single-pass exchangers. In already known designs for the production of ammonia and methanol synthesis gases which employ open-end bayonet tubes, the heat balance problem mentioned above with regard to production of ammonia synthesis gas has precluded elimination of the conventional fired tube reforming furnace.

It is, therefore, an object of this invention to produce synthesis gases for use in the production of ammonia and methanol and to utilize heat from exothermic catalytic reforming in the endothermic reforming step under such conditions that the entire heat of conversion is furnished from the exothermic reforming step.

DESCRIPTION OF THE DRAWING

The single drawing represents a flow diagram of the sequential steps of the method of the present invention.

SUMMARY OF THE INVENTION

According to the present invention and contrary to traditional practice, ammonia and methanol synthesis gases are produced by introducing a major portion of a fresh hydrocarbon component stream along with steam and an oxidant selected from the group consisting of oxygen, air and oxygen-enriched air to an exothermic catalytic steam reforming zone and withdrawing therefrom a first reformed gas. A remaining minor portion of the fresh hydrocarbon component stream is reacted with steam in an endothermic catalytic steam reforming zone and a second reformed gas is withdrawn therefrom which is subsequently combined with the first reformed gas. The resulting combined gases are then passed in indirect heat exchange with reactants in the endothermic catalytic steam reforming zone where they release heat and are subsequently recovered as synthesis gas product.

DETAILED DESCRIPTION OF THE INVENTION

The exothermic catalytic steam reformer zone is operated adiabatically at a pressure between 22 and 70 bar and may be conveniently embodied in the known configuration of a secondary reformer despite the misnomer of that name in the process of the invention. Preferably, from 55 to 85 volume percent of a fresh hydrocarbon component stream is introduced to the exothermic reforming zone together with steam and an oxidant which are collectively referred to hereinafter as the first mixed feed stream. The steam and hydrocarbon components of the first mixed feed stream are preferably first combined and preheated to a temperature between 450° C. and 650° C. When oxygen is selected as the oxidant, such as in the preparation of a synthesis gas for use in the production of methanol, the steam to $C_1$ ratio of the first mixed feed stream preferably is between 2.5 and 4.5 and the oxygen preferably is heated to a temperature between 90° C. and 450° C. prior to introduction to the exothermic catalytic steam reforming zone. When air is selected as the oxidant for preparing a synthesis gas for use in the production of ammonia, the steam to $C_1$ ratio of the first mixed feed stream is preferably between 1.5 and 3.5. When oxygen-enriched air is selected as oxidant, again for preparing a synthesis gas for use in producing ammonia, oxygen preferably constitutes from 25 to 40 volume percent (dry basis) of the oxidant and the steam to $C_1$ ratio of the first mixed feed stream is preferably between 2.5 and 3.5. Oxygen for enrichment of air may be supplied by a modestly sized cryogenic, membrane, or pressure swing absorption unit. The choice between the use of air or oxygen-enriched air is principally an economic matter governed by size and cost of the oxygen unit, utility costs, and the extent of integration of the ammonia plant energy systems with utility systems of the overall production facility. With either choice, the oxidant is preferably preheated to between 480° C. and 720° C. prior to introduction to the exothermic catalytic steam reforming zone.

Like secondary reformers, the exothermic catalytic steam reforming zone operates autothermally but, unlike conventional systems, the major part of total reforming duty is carried out in this zone. The autothermal steam reforming conditions are selected to produce a first reformed gas containing hydrogen, carbon oxides, and in the case of an ammonia synthesis gas, nitrogen at a temperature preferably between 900° C. and 1100° C. The first reformed gas further will contain less than 1.0 volume percent (dry basis) of residual hydrocarbon, i.e., methane, with respect to production of ammonia synthesis gas and less than 2.0 volume percent (dry basis) residual hydrocarbon with respect to production of methanol synthesis gas.

The endothermic catalytic steam reforming zone also operates at a pressure between 22 and 70 bar but is heated through the catalyst tube walls by the first reformed gas as later described. This zone is preferably embodied in a vertical reactor/exchanger having catalyst-filled bayonet tubes with gas passages at their lower ends. The remaining minor portion of the fresh hydrocarbon component stream and steam, and referred to hereinafter as the second mixed feed stream, is also preheated to a temperature between 450° C. and 650° C., then introduced to the endothermic catalytic steam reforming zone, and reacted to produce a second reformed gas containing hydrogen, carbon oxides, and either less than 4.0 volume percent (dry basis) residual hydrocarbon, i.e., methane, when producing ammonia synthesis gas or less than 10.0 volume percent (dry basis) when producing methanol synthesis gas at a temperature typically between 825° C. and 1025° C. Preferably, the steam to $C_1$ ratio of the second mixed feed stream is between 4.0 and 5.0 when producing ammonia synthesis gas and between 2.5 and 4.5 when producing methanol synthesis gas.

In order to provide the total heat requirement of the endothermic reforming zone, the first and second reformed gases are combined and then cooled by indirect heat exchange with the second mixed feed stream within the endothermic catalytic steam reforming zone and recovered therefrom as either an ammonia or a methanol synthesis gas.

Since the synthesis gases typically are recovered at a temperature between 565° C. and 735° C., sensible heat in the gas is preferably recovered by indirect heat exchange with the fresh hydrocarbon component stream which is thereby preheated.

Referring now to the drawing, fresh hydrocarbon component stream in line 1, preferably saturated with water, is combined with steam in line 2 and preheated in feed/effluent heat exchanger 3. A major portion of the fresh hydrocarbon feed in line 4 is combined with additional steam and oxidant introduced respectively in lines 5 and 6 to form the first mixed feed stream which is introduced through line 7 to exothermic catalytic steam reformer 8 and then reacted to form the first reformed gas which is recovered through line 9.

A minor portion of the fresh feed stream in line 10, which typically is combined with additional steam from line 11 when producing a synthesis gas for use in ammonia production, is introduced through line 12 to the catalyst tube side of reformer-exchanger 13 which constitutes an endothermic catalytic steam reforming zone. Catalyst is supported in the open end tubes by screens not shown. A second reformed gas 14 recovered from bottom outlets of the catalyst tubes is combined with the first reformed gas introduced in line 9. The resulting combined gases are cooled by indirect heat exchange with the second feed stream within the catalyst tubes and recovered from the shell side of reactor-exchanger 13 as synthesis gas through line 15. The synthesis gas is then further cooled in feed/effluent heat exchanger 3 and recovered through line 16 for further heat recovery and processing by already known steps to ammonia or methanol depending upon the particular oxidant being employed.

The following Tables show illustrative examples of relevant operating conditions and stream compositions for alternative designs which employ air, or oxygen-enriched air or substantially pure, i.e., 90 +volume percent, oxygen as the oxidant in exothermic catalytic steam reformer 8.

TABLE 1

| | AIR AS OXIDANT | | | | | | | | | |
|---|---|---|---|---|---|---|---|---|---|---|
| Reference Numeral | 7 | | 9 | | 12 | | 14 | | 15 | |
| Pressure (bar) | 41 | | 40 | | 41 | | 40 | | 39 | |
| Temperature (°C.) | 592 | | 989 | | 539 | | 891 | | 616 | |
| Composition | (1) | (2) | (1) | (2) | (1) | (2) | (1) | (2) | (1) | (2) |
| $H_2$ | 27 | 0.8 | 1828 | 38.9 | 12 | 3.0 | 1144 | 74.3 | 2972 | 47.6 |
| $N_2$ | 1942 | 56.9 | 1942 | 41.2 | 7 | 1.7 | 7 | 0.4 | 1949 | 31.2 |
| $CH_4$ | 867 | 25.4 | 21 | 0.5 | 371 | 91.6 | 47 | 3.1 | 68 | 1.1 |
| $H_2O$ | 1588 | — | 1500 | — | 1706 | — | 1232 | — | 2732 | — |

TABLE I-continued

| | AIR AS OXIDANT | | | | | | | | | |
|---|---|---|---|---|---|---|---|---|---|---|
| Reference Numeral | 7 | | 9 | | 12 | | 14 | | 15 | |
| Pressure (bar) | 41 | | 40 | | 41 | | 40 | | 39 | |
| Temperature (°C.) | 592 | | 989 | | 539 | | 891 | | 616 | |
| Composition | (1) | (2) | (1) | (2) | (1) | (2) | (1) | (2) | (1) | (2) |
| $O_2$ | 518 | 15.2 | — | — | — | — | — | — | — | — |
| CO | — | — | 597 | 12.7 | — | — | 187 | 12.1 | 784 | 12.6 |
| $CO_2$ | 27 | 0.8 | 291 | 6.2 | 12 | 3.0 | 155 | 10.1 | 446 | 7.1 |
| Ar | 25 | 0.7 | 25 | 0.5 | — | — | — | — | 25 | 0.4 |
| $C_2^-$ | 7 | 0.2 | — | — | 3 | 0.7 | — | — | — | — |

(1) kg moles/hr
(2) mole % dry basis

TABLE II

| | OXYGEN-ENRICHED AIR AS OXIDANT | | | | | | | | | |
|---|---|---|---|---|---|---|---|---|---|---|
| Reference Numeral | 7 | | 9 | | 12 | | 14 | | 15 | |
| Pressure (bar) | 41 | | 39 | | 41 | | 40 | | 39 | |
| Temperature (°C.) | 616 | | 997 | | 502 | | 939 | | 663 | |
| Composition | (1) | (2) | (1) | (2) | (1) | (2) | (1) | (2) | (1) | (2) |
| $H_2$ | 28 | 1.0 | 1921 | 45.6 | 11 | 2.9 | 1167 | 75.1 | 3088 | 53.7 |
| $N_2$ | 1339 | 46.6 | 1339 | 31.9 | 7 | 1.8 | 7 | 0.5 | 1346 | 23.4 |
| $CH_4$ | 879 | 30.6 | 7 | 0.2 | 359 | 91.7 | 25 | 1.6 | 32 | 0.6 |
| $H_2O$ | 576 | — | 2719 | — | 1712 | — | 1199 | — | 3918 | — |
| $O_2$ | 576 | 20.0 | — | — | — | — | — | — | — | — |
| CO | — | — | 503 | 12.0 | — | — | 209 | 13.5 | 712 | 12.4 |
| $CO_2$ | 28 | 1.0 | 414 | 9.9 | 11 | 2.8 | 145 | 9.3 | 559 | 9.7 |
| Ar | 17 | 0.6 | 17 | 0.4 | — | — | — | — | 17 | 0.3 |
| $C_2^-$ | 8 | 0.3 | — | — | 3 | 0.8 | — | — | — | — |

(1) kg moles/hr
(2) mole % dry basis

TABLE III

| | OXYGEN AS OXIDANT | | | | | | | | | |
|---|---|---|---|---|---|---|---|---|---|---|
| Reference Numeral | 7 | | 9 | | 12 | | 14 | | 15 | |
| Pressure (bar) | 36 | | 35 | | 36 | | 34 | | 33 | |
| Temperature (°C.) | 621 | | 929 | | 621 | | 850 | | 703 | |
| Composition | (1) | (2) | (1) | (2) | (1) | (2) | (1) | (2) | (1) | (2) |
| $H_2$ | 36 | 1.3 | 4004 | 68.5 | 12.0 | 2.0 | 1511. | 71.2 | 5515. | 69.2 |
| $N_2$ | 21 | 0.7 | 20.8 | 0.4 | 6.0 | 1.2 | 6.9 | 0.3 | 27.7 | 0.3 |
| $CH_4$ | 1654 | 58.5 | 59.1 | 1.0 | 549.2 | 91.8 | 156.4 | 7.4 | 215.5 | 2.7 |
| $H_2O$ | 6239 | — | 5682 | — | 2034 | — | 1395 | — | 7077 | — |
| $O_2$ | 1025 | 36.3 | — | — | — | — | — | — | — | — |
| CO | 7 | 0.3 | 887.8 | 15.2 | 2.5 | 0.4 | 247.8 | 11.7 | 1135.6 | 14.2 |
| $CO_2$ | 10 | 0.4 | 873.8 | 14.9 | 3.5 | 0.6 | 200.5 | 9.4 | 1074.3 | 13.5 |
| Ar | — | — | — | — | — | — | — | — | — | — |
| $C_2^-$ | 73 | 2.6 | — | — | 24.2 | 4.0 | — | — | — | — |

(1) kg moles/hr
(2) mole % dry basis

I claim:

1. A method for producing synthesis gases for use in the production of ammonia and methanol from a fresh hydrocarbon component stream which consists of:
   a) forming a first mixed feed stream comprising steam, a major portion of the fresh hydrocarbon component stream, and an oxidant selected from the group consisting of air, oxygen-enriched air and oxygen and introducing the first mixed feed stream to an exothermic catalytic steam reforming zone wherein there is produced a first reformed gas containing less than 2.0 volume percent, dry basis, residual hydrocarbon and withdrawing the first reformed gas therefrom;
   b) forming a second mixed stream comprising a remaining minor portion of the fresh hydrocarbon component stream and steam and introducing the second mixed feed stream to an endothermic catalytic steam reforming zone wherein there is produced a second reformed gas containing less than 10.0 volume percent, dry basis, residual hydrocarbon and withdrawing the second reformed gas therefrom;
   c) combining the first and second reformed gases and cooling the combined first and second reformed gases by passing the combined gases in indirect heat exchange with the second mixed feed stream within the endothermic catalytic steam reforming zone whereby all of the heat required for the endothermic catalytic steam reforming of the second feed stream therein is provided; and
   d) withdrawing and recovering the resulting cooled combined gases as synthesis gas product.

2. The method of claim 1 wherein the major portion of the fresh hydrocarbon component stream is between 55 and 85 volume percent of the fresh hydrocarbon feed.

3. The method of claim 2 wherein the fresh hydrocarbon component stream is preheated to a temperature 450° C. and 650° C.

4. The method of claim 3 wherein the fresh hydrocarbon component stream is preheated by indirect heat exchange with the synthesis gas product.

5. The method of claim 3 wherein the oxidant is air preheated to a temperature between 480° C. and 720° C., the steam to $C_1$ ratio of the first feed stream is between 1.5 and 3.5, the steam to $C_1$ ratio of the second mixed feed stream is between 4.0 and 5.0, the first reformed gas withdrawn from the exothermic catalytic steam reforming zone contains less than 1.0 volume percent, dry basis, residual hydrocarbon and the second reformed gas withdrawn from the endothermic catalytic steam reforming zone contains less than 4.0 volume percent, dry basis, residual hydrocarbon.

6. The method of claim 3 wherein the oxidant is oxygen-enriched air preheated to a temperature between 480° C. and 720° C, the steam to $C_1$ ratio of the first mixed feed stream is between 2.5 and 4.5, the steam to $C_1$ ratio of the second mixed feed stream is between 4.0 and 5.0, the first reformed gas withdrawn from the exothermic catalytic steam reforming zone contains less than 1.0 volume percent, dry basis, residual hydrocarbon and the second reformed gas withdrawn from the endothermic catalytic steam reforming zone contains less than 4.0 volume percent, dry basis, residual hydrocarbon.

7. The method of claim 1 wherein the oxidant is oxygen preheated to a temperature between 90° C. and 450° C. and wherein the steam to $C_1$ ratio of each of the first mixed feed stream and the second mixed feed stream is between 2.5 and 4.5.

* * * * *